ELECTRO-OPTICAL INTELLIGENCE STORAGE APPARATUS

Filed March 18, 1964

Inventor
J.P. BIRCHENOUGH
By
Paul W. Hemminger
Attorney

United States Patent Office 3,310,788

Patented Mar. 21, 1967

3,310,788

ELECTRO-OPTICAL INTELLIGENCE STORAGE APPARATUS

James Philip Birchenough, London, England, assignor to International Standard Electric Corporation, New York, N.Y., a corporation of Delaware Filed Mar. 18, 1964, Ser. No. 352,780
Claims priority, application Great Britain, Apr. 19, 1963, 15,476/63
9 Claims. (Cl. 340—173)

The present invention relates to an electrical store of the so-called data-addressed type in which opto-electronic elements are used.

As data addressed store, also known as an associative store, is one in which each of a number of items of data is stored in company with its address. When the address for a wanted item is received it is, in effect, applied to all stored addresses. The stored address identical to the received address is selected and the associated data item read out.

According to the present invention there is provided an electrical data-addressed store, in which response to a received data-address and the read-out of the data associated with that address are effected by the use of opto-electronic means.

According to the present invention there is provided an electrical semi-permanent store of the data-addressed type, which comprises a co-ordinate array of opto-electronic elements each row of which relates to one of said addresses and the associated data, and an opto-electronic read-out device for each said row, and means whereby an address offered to the store is compared with all of said rows and enables the read-out device for the row to which it relates.

It should be noted that in the present specification and claims the terms "row" and "column" are used in the electrical sense; physically the terms are interchangeable.

An embodiment of the invention will now be described with reference to FIGS. 1 to 3. These figures show sufficient details of a single row of a co-ordinate matrix store embodying the invention to enable one skilled in the art to understand and master the invention.

The semi-permanent store described herein uses controllable luminous elements, photo-sensitive elements and masks to store the information, and information can be read from the store when a row is interrogated or addressed by some part of its contents (so-called associative store). The luminous elements actually used are electroluminescent cells, the photo-sensitive elements are photoconductive cells, whilst the masks are holes or "no-holes."

Figure 1:
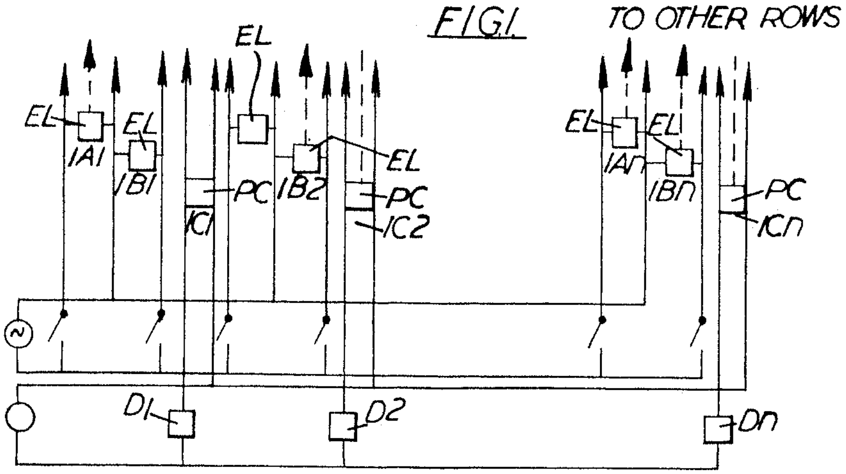

In FIG. 1 the row elements 1A1 to *n* and 1B1 to *n* are electroluminescent cells. By means of appropriate switches (diagrammatically represented as contacts) either the A cells or B cells or both of any position 1 to *n* in all rows including the one shown in FIG. 1 can be energised from a source of high frequency alternating current, that is, each contact or its electronic equivalent when closed energises a whole column of A or B elements simultaneously. The row elements 1C1 to *n* are photoconductive cells and each column 1 to *n* of such cells is connected in parallel between a current source and a detector D; the current source can, as shown, be common to all columns.

Figure 2:
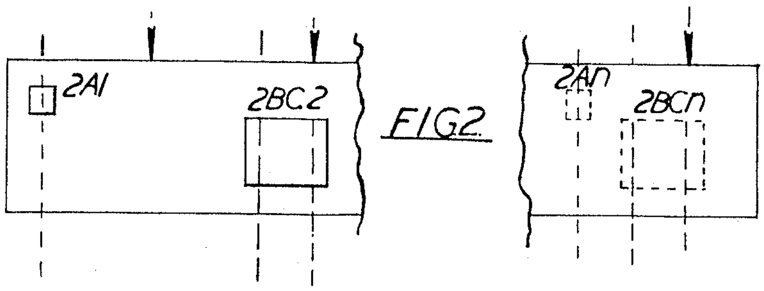

In FIG. 2 a row mask is shown having holes in such places that light from an A or a B cell, but not both, at each column position 1 to *n* can pass through. Where a B cell is thus exposed the associated C cell is also exposed to light in the opposite direction. That is, each mask represents the information word stored in one of the rows of the store. Each mask contains both an address, by virtue of the arrangement of its holes, and corresponding data information. One possible application of such an arrangement, as will be seen below, is a translator such as is used in an automatic telephone exchange.

Figure 3:
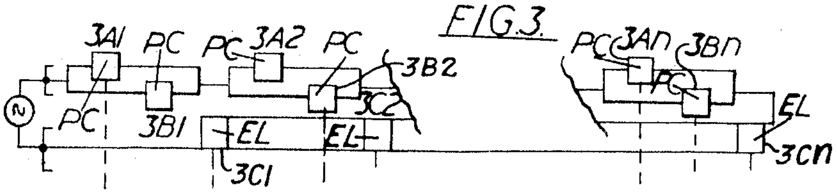

In FIG. 3 the row elements A and B are photo-conductive cells. The A cell and B cell of each column position 1 to *n* are connected in parallel while all the parallel connections are in series with each other and with a high frequency source of alternating current and also with all the row elements C, which are electroluminescent cells, these latter being in parallel. When both of the photoconductors of any one of the pairs of photoconductors is dark, the resistance between the source and the electroluminescent cells is too high for them to light, but if one photoconductor in *each* pair is illuminated then the resistance between the source and the electroluminescent cells is low enough for them to light.

In order to retrieve information from the store, using part of the data held in the row for addressing, those electroluminescent cells, A or B, of FIG. 1 which corresponds to the "0" or "1" bits of the "address" are lit while all the remaining cells both A and B, corresponding to the rest of the data are lit. Thus in all rows in that portion of the row not containing the address there will be light from an electroluminescent cell passing through a hole in the row mask, FIG. 2, and illuminating one of each parallel connected photoconductor A or B in FIG. 3, while in the "address" portion of the row only in the row corresponding exactly with the lit cells will light illuminate one photoconductor in each pair.

By way of example, the A elements in each figure represent an "0," and the B elements represent a "1." The information in the mask of FIG. 2 is to be retrieved by using position 1 and 2 for the address. In FIG. 1 elements 1A1 and 1B2 and both elements in position 3 to *n* are lit. Light passes through the holes in the mask of FIG. 2 and falls on the elements 3A1, 3B2 and one element of each pair in positions 3 to *n* thus bringing the resistance of the chain of paralleled elements low enough to allow cells 3C1 to 3C*n* to light. The light from these cells passes through the mask at each "1" hole and illuminates the corresponding photoconductor in FIG. 1 so that the detector associated with it is energised and indicates the information stored in the selected row. If only one bit in the address portion of a row is different from the required address, that row cannot be selected since two parallel elements remain dark, and present a high (relatively) resistance.

The store described above could, as already mentioned function as a translator in a telephone exchange. In such a case, each mask is a strip bearing one set of holes—the address—selected in accordance with (in the London directory area system) the A–B–C digits, and another set of holes representing the translation. The reception of the A–B–C digits closes a set of contacts for the row containing the wanted translation, as a result of which read-out occurs as just described. Changing a translation is readily done by removing one mask strip and inserting another.

If such a store were built using electroluminescent cells of the luminous capacitor type, and ordinary photoconductive cells of the selenium or cadmium sulphide type, the store would have a response time which, by standards current in the computer art is relatively poor. However, this response time would be adequate for many purposes, including that of translation in telephone exchanges. It would also have a low dark-to-lit resistance ratio but again this would be acceptable for many uses, again including that of translation as already mentioned. However, light sources of different types, such as light emitting pn junctions, and light sensitive elements such as photo-transistors, particularly unipolar photo-transistors, would improve response time and dark-to-lit resistance ratios sufficiently to make this store of much wider application.

Where, as in telephone exchanges, the semi-permanent store is used as a translator, it would be possible to employ it as a "bi-directional" translator. In such a case, for one "direction" of translation operation is as above, while for the other "direction" data which would normally be read out of one of the rows is applied to all data columns, which causes the corresponding address to be read-out. This would need enlarged mask holes for both portions of the row and detectors for all columns. In this case, the functions of "data" and "address" are, in effect, interchanged.

What I claim is:

1. A photo-optical-logic memory comprising first and second pluralities of cell means separated by a punched opaque light mask memory card means having a plurality of binary words selectively stored therein by said punches to provide a coded pattern of light and dark areas, means for transmitting light in a selective pattern from said first plurality of cell means through said memory card to said second plurality of cell means, said memory card either passing or blocking said transmitted light according to the plurality of binary word patterns stored therein, said associations of said patterns being such that only one of said binary words is identified by the pattern of light read by said second plurality of cells, means associated with said one binary word for returning light from all data information digital positions of said one word, said returned light passing from said second plurality of cell means through said memory card to said first plurality of cell means, said memory card either passing or blocking the returned light in accordance with the binary code of the one word stored therein, and means associated with said first plurality of cells for reading out the binary code of said one word.

2. A photo-optical-logic memory means comprising light conducting and light responsive cells separated by an opaque memory card having light transmitting sections therein for storing a plurality of binary words, means for transmitting a plurality of coded light beams in a first direction through all binary word sections in said card, and means responsive to a coincidence between the code of said light beams and the code of said light transmitting sections of one of said words for returning light in an opposite direction through each of the light transmitting sections of said one word.

3. The memory of claim 2 wherein said cells are arranged in coordinate rows and columns, each row including an address and information data, said coded light beams being offered to the address section of each row.

4. The memory of claim 2 wherein the light transmitting sections of said memory card are arranged in coordinate rows and columns, there being an address section and an information data section for each row.

5. The memory means of claim 4 and means whereby said light conducting and light responsive means are located on each side of said memory card for each of said rows, and means responsive to the light responsive cells of a given row reading its own address for enabling the light transmitting means of said given row.

6. An electrical semi-permanent store of the data-addressed type; in which for each address and its associated data there is a row of opto-electronic elements of a coordinate array of such elements; in which each said row includes a pair of electro-luminescent elements for each address bit and each data bit, one for the binary 1 signification and one for the binary 0 signification, and a photo-conductive element for each address bit and each data bit, in which for each said row there is an opto-electronic read-out device formed by a series connection of pairs of photo-conductive elements, there being one such pair for each address bit position and each data bit position, and electro-luminescent elements, there being one electro-luminescent element for each data bit place; in which for each combination of an address and a data item to be handled there is provided an opaque mask which can be interposed between one of said rows of opto-electronic elements and the corresponding opto-electronic read-out device, which mask has light transmitting areas appropriate to the address and the data to which it relates; in which each such mask has a light-transmitting area for each address bit which, when the mask is in use, allows light to pass from the appropriate electroluminescent element for that address bit to one of that address bit's pair of photo-conductive elements of said read-out device; in which each said mask also has a set of light transmitting areas, one per data bit, each of which can pass light from the appropriate one of the electro-luminescent elements for that data bit to the corresponding photo-conductive element of said read-out device, each such light transmitting area also passing light from the appropriate electro-luminescent element of said read-out device to the corresponding photo-conductive element of said row; in which to read out the data which corresponds to an address, the columns of electro-luminescent elements of all said rows which correspond to that address are energised, as are all columns of electro-luminescent elements of all storage rows for data bits, so that light from those elements passes through said masks to the read-out device; in which the impedance of the series connection of photo-conductive and electro-luminescent elements of each said row is such that only one such read-out device can assume an operative condition wherein the current flowing therein makes its electro-luminescent elements emit light; in which when the electro-luminescent elements of one of said read-out devices emit light, light from some of them passes through the mask apertures to a selection of the photo-conductive elements of the corresponding row; and in which a set of detectors are provided which serve all data columns of said array, so that when read-out is effected a selection of said detectors, dependent on the data to be read out, responds.

7. An electrical semi-permanent store as claimed in claim 6, and in which each said pair of photo-conductive elements of a read-out device are connected in parallel.

8. An electrical semi-permanent store as claimed in claim 6 in which each row of the array is permanently allocated to one address, and that no photo-conductive elements are provided for that row.

9. A store as claimed in claim 6 in which means is provided whereby a data item on reception can cause the read out of the corresponding address, so that the device is a bi-directional translator.

References Cited by the Examiner

UNITED STATES PATENTS

| | | | |
|---|---|---|---|
| 3,046,540 | 7/1962 | Litz et al. | 340—173 |
| 3,131,291 | 4/1964 | French | 235—61.11 |

FOREIGN PATENTS

| | | |
|---|---|---|
| 879,660 | 10/1961 | Great Britain. |

OTHER REFERENCES

French, W. K.: "Photologic Memory," IBM TDB, vol. 3, No. 7, December 1960.

BERNARD KONICK, *Primary Examiner.*

J. BREIMAYER, *Assistant Examiner.*